United States Patent [19]

Puro

[11] 4,010,832
[45] Mar. 8, 1977

[54] RETURN SPRING FOR TEETH CLUTCH — TWO STAGE FORCE

[75] Inventor: John Frederick Puro, Elmira, N.Y.

[73] Assignee: Facet Enterprises, Inc., Tulsa, Okla.

[22] Filed: June 24, 1975

[21] Appl. No.: 589,815

[52] U.S. Cl. .............................. 192/84 C; 192/89 B
[51] Int. Cl.² .......................................... F16D 27/10
[58] Field of Search .......... 192/84 A, 84 AA, 84 B, 192/84 C, 89 B; 188/72.3, 161, 163, 216

[56] References Cited
UNITED STATES PATENTS

| | | | |
|---|---|---|---|
| 3,337,013 | 8/1967 | Wrensch | 192/84 C X |
| 3,446,322 | 5/1969 | Wrensch | 192/84 C X |

FOREIGN PATENTS OR APPLICATIONS

| | | | |
|---|---|---|---|
| 961,772 | 6/1964 | United Kingdom | 192/84 C |

*Primary Examiner*—Allan D. Herrmans
*Attorney, Agent, or Firm*—Remy J. VanOphem

[57] ABSTRACT

An electromagnetic clutch has a toothed driving clutch member and a toothed driven clutch member which are moved together upon energization of an electromagnet with their teeth in engagement. A spring disengages the teeth when the electromagnet is deenergized. The spring provides a relatively large spring force for initial breakaway to overcome residual magnetism and metal to metal contact of the teeth. After initial breakaway the spring provides only sufficient force to further separate the members. With this arrangement a small magnet may be used to engage the clutch because the large force of the spring must be overcome only during final engagement of the clutch.

1 Claim, 2 Drawing Figures

RETURN SPRING FOR TEETH CLUTCH — TWO STAGE FORCE

The invention relates to electrically operated friction devices and more particularly to electromagnetic clutches.

BACKGROUND OF THE INVENTION

Electromagnetic clutches as used heretofore have a toothed driving clutch member and a toothed driven clutch member which are moved together upon energization of an electromagnet with their teeth in engagement. A spring disengages the teeth when the electromagnet is deenergized. Residual magnetism in the driving and driven clutch members tends to impede separation of the clutch members and a heavy spring is required for initial breakaway from metal to metal contact of the teeth. The same heavy spring is used to further move the clutch members a sufficient distance to separate the teeth and permit relative rotation of the clutch members. When the clutch is engaged by energizing the electromagnet the magnetic force must overcome the heavy spring force during the entire movement of the clutch members to engage the teeth.

SUMMARY OF THE INVENTION

The present invention relates to an electromagnetic clutch which includes a novel spring for separating the clutch members from one another. The spring exerts a large spring force for initial breakaway sufficient to overcome residual magnetism and metal to metal contact and a small spring force to further separate the clutch members after initial breakaway. The spring has stiff fingers with a relatively small offset for separating the clutch members when the teeth are bottomed and light fingers with a large offset for further separating the clutch members until the teeth are completely disengaged. The spring may be stamped from a steel disk or other spring material and is inexpensive to manufacture. With this arrangement a small magnet may be used because the larger force of the spring must be overcome only during final engagement of the clutch members when the air gap in the magnetic circuit is small.

The invention contemplates an electromagnetic clutch having a driving clutch member and a driven clutch member, an armature on one of said members and an electromagnet having a pair of poles on the other of said members for providing a driving engagement between the members when the electromagnet is energized, and spring means for disengaging the armature from the poles when the electromagnet is deenergized having means for providing a force sufficient for initial breakaway to overcome residual magnetism and having means for providing a smaller force sufficient to further separate the armature from the poles to permit relative rotation of the clutch members.

DRAWING

FIG. 1 is a side view partly in section of an electromagnetic clutch constructed according to the invention, FIG. 2 is a transverse view taken approximately on the line 2—2 of FIG. 1.

DETAILED DESCRIPTION OF THE INVENTION

Figure 1:
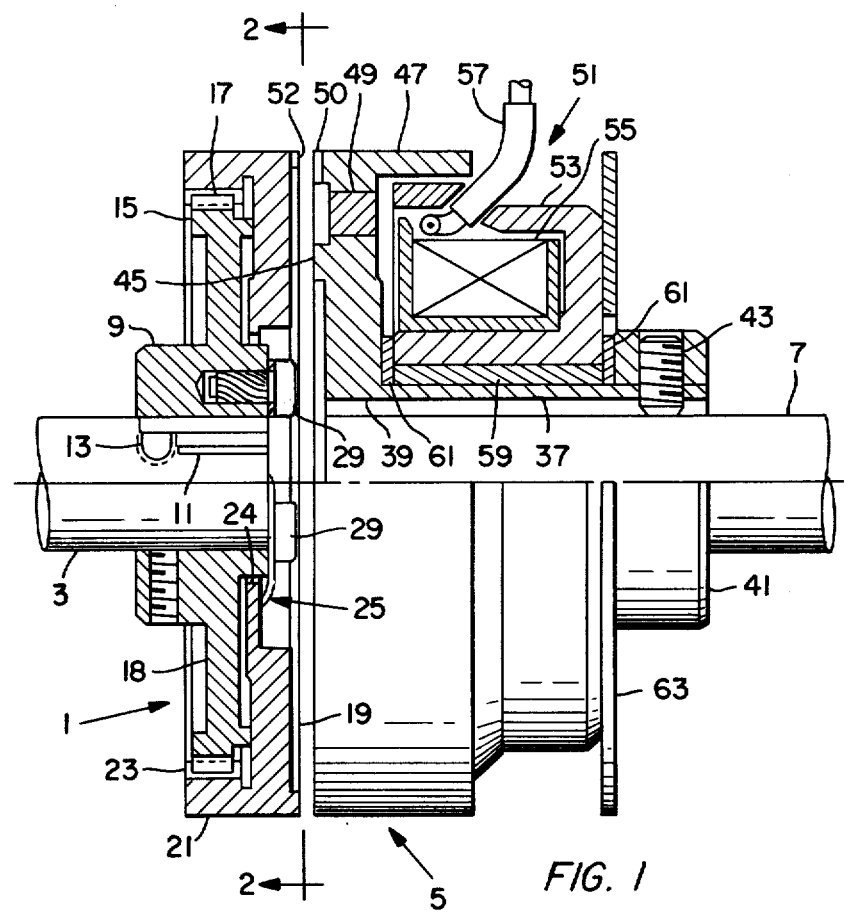
Figure 2:
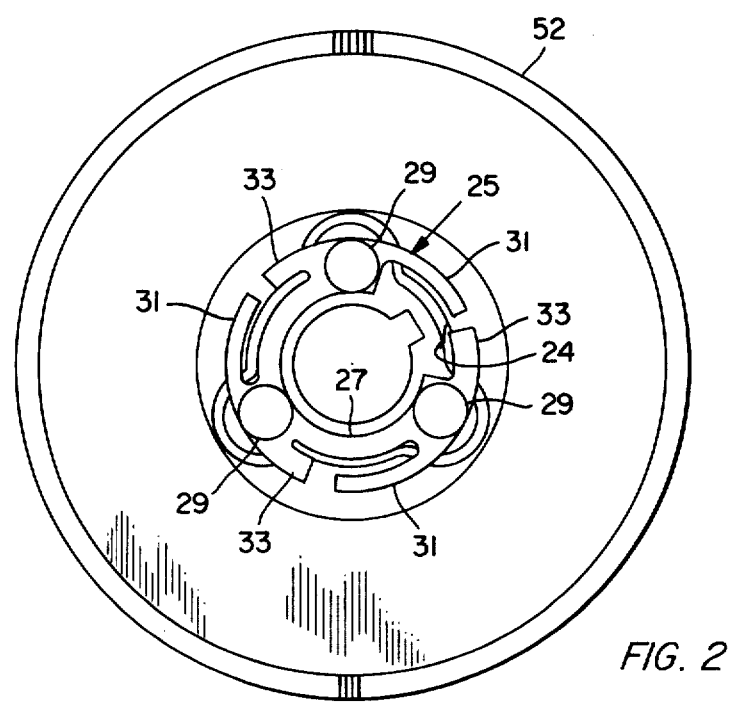

Referring to the drawing, the novel electromagnetic clutch constructed according to the invention and shown therein, comprises an armature assembly 1 keyed to a driving shaft 3 and a magnetic field assembly 5 keyed to a driven shaft 7. Armature assembly 1 includes a hub 9 secured to driving shaft 3 by a key 11 and set screw 13. A rim 15 with a circumferential spline 17 is attached to hub 9 by a disk 18. An armature 19 has a circumferential flange 21 with a spline 23 on the inner circumference cooperating with spline 17 on rim 15 for drivably connecting the hub to the armature and for permitting relative axial movement of the armature on the hub. Armature 19 has an axial aperture 24 therein for receiving hub 9.

A novel spring 25 constructed according to the invention for moving armature 19 axially on hub 9 for disengaging the clutch has a ring 27 secured to hub 9 by screws 29 which extend through aperture 24. By attaching the spring to the armature assembly 1, the spring is prevented from rubbing on magnetic field assembly 5. The spring has a plurality of fingers 31 and 33 integral with ring 27 for engaging armature 19.

Fingers 33 are relatively wide with a small offset and exert a large force on the armature only during initial breakaway from magnetic field assembly 5. Fingers 33 exert a force sufficient to overcome metal to metal contact and residual magnetic forces. Fingers 31 are relatively narrow with a large offset and exert a small force on the armature during its entire movement axially on hub 9. Fingers 31 exert a force sufficient to move the armature axially on the hub after initial breakaway.

Magnetic field assembly 5 has a hub 37 secured to driven shaft 7 by a key 39 and a ring 41 with a set screw 43. Hub 37 has an inner pole 45 and an outer pole 47 of magnetic material separated by a ring 49 of nonmagnetic material, such as aluminum. Outer pole 47 has teeth 50 near its circumference engaging corresponding teeth 52 on armature 19 when the clutch is engaged.

An electromagnet 51 has a circular core 53 of magnetic material having a substantially "U" shaped cross section and with a coil 55 thereon between the legs of the "U". The coil is connected to an electrical lead 57 for energization by a power source. Electromagnet 51 is rotatably mounted on hub 37 by a bearing 59 and thrust washers 61 at each end of the electromagnet. An end plate 63 is secured to core 53. Hub 37 rotates relative to electromagnet 51 when the clutch is engaged to avoid the use of slip rings for providing power to the electromagnet.

When the electromagnet is energized, flux passes from the outer leg of core 53 to outer pole 47, armature 19 to inner pole 45 and to the inner leg of core 53.

OPERATION

To engage the clutch electromagnet 51 is energized and the magnetic force moves armature 19 axially on hub 9 along splines 17 and 23 toward inner and outer poles 45 and 47 to engage teeth 52 on the armature with teeth 50 on the outer pole and provide a driving connection between the armature and the poles. To disengage the clutch, electromagnet 51 is deenergized and spring 25 moves armature 19 axially on hub 9 to disengage teeth 50 and 52, to permit relative rotation of armature assembly 1 and magnetic field assembly 5.

Fingers 33 provide a relatively large spring force for initial breakaway of armature 19 from poles 45 and 47 to overcome residual magnetism and metal to metal contact of the teeth. After initial breakaway fingers 33 lose contact with armature 19 and fingers 31 move the armature axially relative to hub 9 a sufficient distance to completely disengage teeth 50 and 52.

With this arrangement the magnetic force required for engaging teeth 50 and 52 needs overcome only the small spring force of fingers 31 during the greater part of the movement of armature 19 towards the magnetic poles 45 and 47 and the large spring force of fingers 33 only during final engagement of teeth 50 and 52 when the air gap between the poles and armature is small. The spring may be stamped from a steel disk or other spring material and is inexpensive to manufacture.

What is claimed is:

1. An electromagnetic clutch comprising:
   a driven clutch member;
   a driving clutch member mounted adjacent to said driven clutch member for communication with said driven member;
   electromagnet actuating means mounted to said driven and driving clutch members for providing a driving engagement between said members when the electromagnet means is energized, said actuating means further comprising:
   armature means;
   a pair of magnetic poles mounted adjacent said armature means for drivably engaging said armature means;
   mutually engagable driving teeth mounted to said armature means and one of said poles for engagement of said armature means to said one pole when said electromagnet means is energized,
   said armature means further including a hub member, an electromagnetic armature mounted adjacent said hub member for communication therewith; a spline connecting said armature to said hub for providing relative movement between said hub and said armature; and
   biasing means interposed said driven and driving clutch members for disengaging said actuating means when said electromagnet is deenergized, said biasing means further comprising;
   first means for providing a force sufficient to overcome residual magnetism for initial break away, said first means having a plurality of wide spring-like fingers having a small offset;
   second means for providing a smaller force sufficient to further separate said armature from said poles, said second means having a plurality of narrow spring-like fingers having a large offset, so that the spring force sufficient for initial breakaway of the armature from the poles is effective only during initial breakaway and the smaller spring force is thereafter effective; and
   means for attaching said first and second providing means to said hub member whereby the spring-like fingers engage the armature.

* * * * *